Sept. 10, 1929.  N. A. BEST ET AL  1,727,390

PISTON

Filed April 21, 1925

INVENTORS.
Norman A. Best
BY John E. Hoy

ATTORNEYS.

Patented Sept. 10, 1929.

1,727,390

UNITED STATES PATENT OFFICE.

NORMAN A. BEST AND JOHN E. HOY, OF MIDLAND, MICHIGAN, ASSIGNORS TO THE DOW CHEMICAL COMPANY, OF MIDLAND, MICHIGAN, A CORPORATION OF MICHIGAN.

PISTON.

Application filed April 21, 1925. Serial No. 24,752.

The difficulty encountered in securing proper lubrication of the cylinder wall of an internal combustion engine, where the bearing clearances between such wall and the piston are small, is well recognized (see article entitled "Scuffed pistons result from cold jacket and lack of oil" by Frank Jardine in Automotive Industries, issue of July 31, 1924). In other words, while a relatively small quantity of oil is sufficient for lubrication at the point in question when the engine is at normal running temperature, when cooled to lower temperature, as when left standing in cold weather, the provision ordinarily made for lubricating such cylinder walls has been found entirely inadequate.

The present invention has as one principal object the inclusion in a piston of so-called composite type of means whereby lubricant in adequate amount is immediately supplied to the bearing surface of the surrounding cylinder even when the engine is started cold. More particularly, the invention relates to a novel form of composite piston in which the head and body thereof is cast of light metal with a shell of iron or steel surrounding and attached to the skirt portion. It will be understood, however, that the principle of the invention is not limited to such particular type of piston.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1:
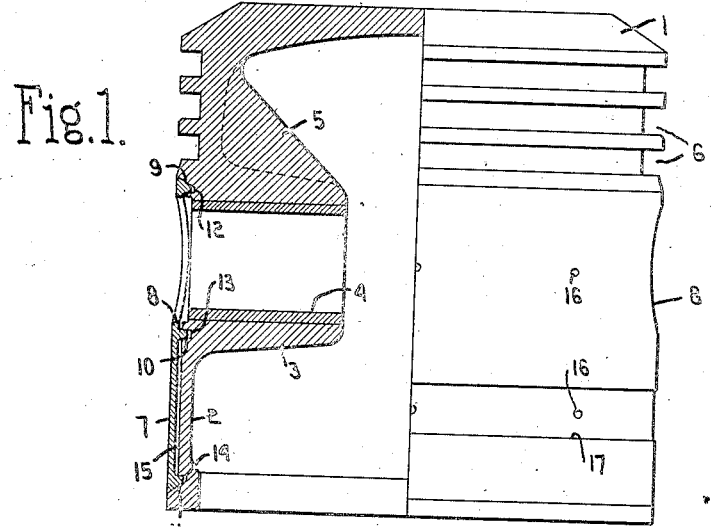
Figure 2:
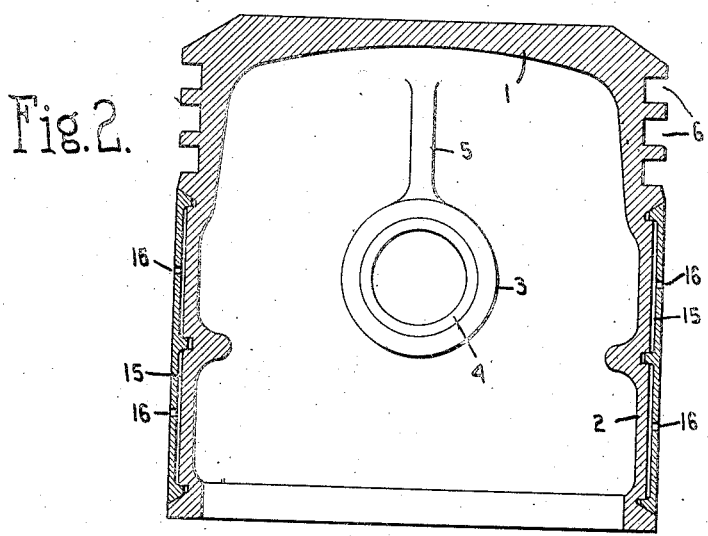
Figure 3:
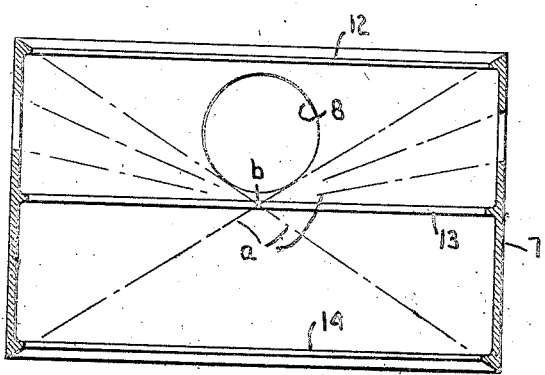

Fig. 1 is partly a side elevation and partly a central vertical section of a piston embodying the present improvements; Fig. 2 is a central vertical section thereof taken on a plane at right angles to the plane of the sectioned portion of Fig. 1; and Fig. 3 is a sectional view on the same plane as that of Fig. 2, but showing apart from the main body of the piston a shell or sleeve that constitutes the wearing portion of the skirt of said piston.

In its general features of construction the illustrated piston is similar to those of cast iron or light metal alloys heretofore used in internal combustion engines. In other words, such piston comprises a more or less cylindrical head portion 1 from which depends a sleeve or skirt portion 2. The latter is formed with oppositely placed, inwardly directed bosses 3 which are apertured to receive a wrist pin (not shown), whereby the piston is attached to the connecting rod. Bushings 4 of bronze or equivalent bearing metal are preferably fitted to the apertures in such bosses, as best shown in Fig. 1, and an integral rib 5 between each boss and the head 1 contributes to the strength of the structure. In order effectually to seal the piston within the walls of the cylinder within which it works, resilient piston rings (not shown) of familiar construction are seated in annular recesses 6 in head portion 1, as need not be further explained.

As hereinbefore indicated, the main body of the piston comprising such head portion 1 and skirt 2 will preferably be cast of a light metal alloy as for example one of the known aluminum or magnesium alloys available for this purpose. Substantially surrounding such skirt portion 2 is a shell or band 7 which, in contradistinction to the light metal alloy whereof the piston proper is composed, will be made either of cast iron or steel or other metal having a relatively low coefficient of expansion. Cast iron will be preferably used for such shell or band so that its coefficient of expansion will be the same, or approximately the same, as the walls of the engine cylinder which is ordinarily made of cast iron.

Where such shell, as illustrated in the figures of the drawing, extends above the wrist pin openings in bosses 3, it will be formed with corresponding openings 8, preferably of somewhat larger diameter, and the lower edge of such shell will furthermore terminate somewhat short of the lower edge of the piston skirt 2. Adjacent its upper and lower edges, as well as at an intermediate point lying approximately midway between such edges, said shell is provided on its inner face with encircling ribs 9, 10 and 11 that engage and closely interfit with corresponding annular grooves or recesses 12, 13 and 14 in the opposed face of the skirt portion 2. As a matter of fact, the metal composing the piston proper (head 1 and skirt 2) is cast in a suitable mold in which such shell or band 7 has been previously placed, the walls of the mold being formed to give the proper contour to the exposed portions of the body and skirt.

Accordingly, at the temperature of casting, the skirt portion 2 and such shell 7 will be in close fitting contact throughout and this condition will be approximated at the relatively high temperature obtaining within the engine cylinder under normal operating conditions. However, when the engine is cold and the temperature of the piston accordingly much reduced below such normal operating temperature, the skirt being made, as indicated, of metal having a lower coefficient of expansion than the shell will contract a correspondingly greater amount and a space will be left not only between the inner edges of the ribs 9, 10 and 11 and the bottoms of the corresponding grooves 12, 13 and 14, but also between the cylindrical opposed faces of the skirt and shell that lie between said ribs.

It will be noted, as best shown in Fig. 3, that the lateral surfaces of said ribs 9, 10 and 11 and the corresponding contacting surfaces of the respective grooves 12, 13 and 14, are inclined more or less with respect to the cylindrical face of the body, the lines $a$ of contact in the particular construction shown being such as to meet at a point $b$ on the central axial line within the piston. This point or other corresponding point thus selected within the piston may be referred to as the neutral expansion point of the structure and, as signified by this term, the result of having the lateral engaging surfaces of the parts in question thus all diverge from such common central point within the piston will be to maintain such surfaces in contact, irrespective of any changes in the piston skirt and surrounding shell due to their contraction or expansion, this despite the differences in the rate of such contraction or expansion occasioned by the difference in the coefficients of expansion of the metals whereof the parts in question are respectively formed.

Accordingly, the shell or band 7 will at all times remain firmly attached to the piston skirt 2 through the medium of ribs 9, 10 and 11, it being understood that projections of other forms may be utilized in the manner just described in place of such ribs specifically. The foregoing construction, however, will not prevent the separation to a slight degree in the manner hereinbefore explained of the cylindrical faces of the skirt and such shell, it being noted that they are shown as thus separated in Figs. 1 and 2 which therefore represent the piston before it has become heated up in operation. However, the annular spaces 15 just referred to are measurably decreased in capacity, immediately the piston becomes heated, and such capacity will then again increase when the piston again cools off.

The shell 7 is provided with a series of holes 16 that are drilled or otherwise formed therein so as to provide for the flow of the oil or other lubricant ordinarily used in internal combustion engines between the spaces in question and the outer surface of the shell. It will be understood that the location of these holes will vary to suit different conditions of service as well as different designs of piston. When the engine is running, the spaces although reduced to minimum capacity, will tend to fill up with oil that is drawn in through such openings 15 and when the engine is stopped and cools off, due to the increase in capacity of such spaces, more oil will be drawn in from the clearance space surrounding the gliding surface of the piston. If desired, a shallow groove 17, as shown in association with the lower circle of openings 16, may be provided in the outer cylindrical surface of the shell 7 to insure a sufficient supply of oil thus to fill the corresponding space 15. When the engine is again started up, the body of the piston, due to its greater coefficient of expansion and to the fact that the head of the piston is of course directly exposed to the heat of gases of combustion in the explosion chamber of the engine, begins to expand immediately and more rapidly than the shell. The excess oil in the spaces 15 is accordingly forced out, thus lubricating the gliding surface of the piston, irrespective of whether the means, e. g. splash system or the like provided for such lubrication, begin to function properly at once or not. Even where oil is not actually forced out from recesses 15, due to there having been an insufficient quantity available to fill such spaces, contraction of these spaces will raise the oil therein high enough to cause it to flow out through the holes 16 by gravity.

The spaces in question, it will accordingly be seen, constitute in effect an oil reservoir in the piston itself which automatically operates to take up and discharge oil under conditions when the ordinary lubricating means provided in internal combustion engines are ineffective, if not entirely inoperative. In other words, the piston is insured of sufficient lubrication during the critical few minutes following the starting of the engine.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. A piston, or like mechanical element, formed with an encircling reservoir for supplying lubricant to the bearing surface, the inner and outer walls bounding such reservoir being formed of metals having different co-efficients of expansion, whereby the capacity of such reservoir is increased upon fall, and decreased upon rise of temperature.

2. A piston, or like mechanical element, formed with an encircling reservoir for lubricant, the inner and outer walls bounding such reservoir being formed of metals having different co-efficients of expansion, whereby the capacity of such reservoir is increased upon fall, and decreased upon rise of temperature, such outer bounding wall having openings adapted to provide communication between such reservoir and the gliding surface of the piston.

3. In a piston, or like mechanical element, the combination of a body and a part surrounding the same, said body and part being composed of metals having different co-efficients of expansion and being formed to provide an interposed annular space of variable capacity depending upon temperature and communicating with the gliding surface of the piston.

4. In a piston, or like mechanical element, the combination of a body and a part surrounding the same, said body and part being formed to provide an interposed annular space for supply of lubricant to the gliding surface, and said body being composed of a metal having a higher co-efficient of expansion than said surrounding part, whereby the capacity of such space is increased upon fall, and decreased upon rise of temperature.

5. In a piston, or like mechanical element, the combination of a body composed of a light metal alloy, and a shell of ferrous metal surrounding said body, said body and shell being formed to provide an interposed annular space that is closed save for openings in said shell adapted to provide communication between such space and the gliding surface of the piston.

6. In a piston, or like mechanical element, the combination of a body composed of a light metal alloy, and a shell of ferrous metal surrounding said body, said body and shell being formed to provide an interposed annular space that is closed save for an encircling series of openings in said shell adapted to provide communication between such space and the gliding surface of the piston.

7. In a piston, or like mechanical element, the combination of a body composed of a light metal alloy, and a shell of ferrous metal surrounding said body, said body and shell being formed to provide a plurality of interposed annular spaces and said shell having corresponding encircling series of openings adapted to provide communication between such spaces, respectively, and the gliding surface of the piston.

8. In a piston, or like mechanical element, the combination of a body composed of a light metal alloy, and a shell of ferrous metal surrounding said body, said body and shell being formed with interengaging ribs and grooves whereby an interposed annular space is provided, and said shell having openings adapted to provide communication between such space and the gliding surface of the piston.

Signed by us, this 17th day of April, 1925.
JOHN E. HOY.
NORMAN A. BEST.